United States Patent
Yamauchi et al.

(10) Patent No.: US 10,144,288 B2
(45) Date of Patent: Dec. 4, 2018

(54) LCD DISPLAY WITH HIGHLIGHTING

(71) Applicants: DENSO International America, Inc., Southfield, MI (US); DENSO CORPORATION, Kariya-shi, Aichi-ken (JP)

(72) Inventors: Shunji Yamauchi, Farmington Hills, MI (US); Homare Shirai, Commerce Township, MI (US); Charles Hummer, Royal Oak, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 142 days.

(21) Appl. No.: 15/087,063

(22) Filed: Mar. 31, 2016

(65) Prior Publication Data

US 2017/0285387 A1 Oct. 5, 2017

(51) Int. Cl.
*G02F 1/1335* (2006.01)
*B60K 37/00* (2006.01)
*B60K 35/00* (2006.01)
*G02F 1/1343* (2006.01)

(52) U.S. Cl.
CPC ............... *B60K 37/00* (2013.01); *B60K 35/00* (2013.01); *G02F 1/133603* (2013.01); *G02F 1/133606* (2013.01); *B60K 2350/203* (2013.01); *B60K 2350/2039* (2013.01); *G02F 1/134327* (2013.01)

(58) Field of Classification Search
CPC ........... G02F 1/133608; G02F 1/13314; G02F 1/133603; G02F 1/33606; G02F 1/133621; G02F 2001/133374; G02F 2001/133626; G02F 2001/133322; G02F 2001/133391; B60K 2350/2039; B60K 2350/106
USPC ................................................. 349/58, 61, 64
See application file for complete search history.

(56) References Cited

U.S. PATENT DOCUMENTS

| 2007/0103889 A1* | 5/2007 | Hsu .................... G02F 1/133604 362/97.2 |
| 2008/0012836 A1 | 1/2008 | Yokota |
| 2008/0030648 A1* | 2/2008 | Morita .............. G02F 1/133611 349/64 |

(Continued)

FOREIGN PATENT DOCUMENTS

JP  2007062516 A  3/2007
JP  2012-194473  10/2012

*Primary Examiner* — Angela K Davison
(74) *Attorney, Agent, or Firm* — Harness, Dickey & Pierce, P.L.C.

(57) ABSTRACT

A display including a liquid crystal layer, a light source, and a wall. The liquid crystal layer includes a first display area, a second display area, and a transition area therebetween. The light source is configured to generate light of a first intensity to illuminate the first display area with light of the first intensity, and generate light of a second intensity that is greater than the first intensity to illuminate the second display area with light of the second intensity. The wall is opposite to the transition area and is configured to permit passage of light of the first intensity and light of the second intensity to the transition area such that at the transition area there is a gradual transition from light of the second intensity proximate to the second display area to light of the first intensity proximate to the first display area.

19 Claims, 2 Drawing Sheets

(56) References Cited

U.S. PATENT DOCUMENTS

2011/0296340 A1* 12/2011 Nakagawa ......... B60H 1/00985
            715/783
2011/0301810 A1   12/2011 Hisatsugu et al.

* cited by examiner

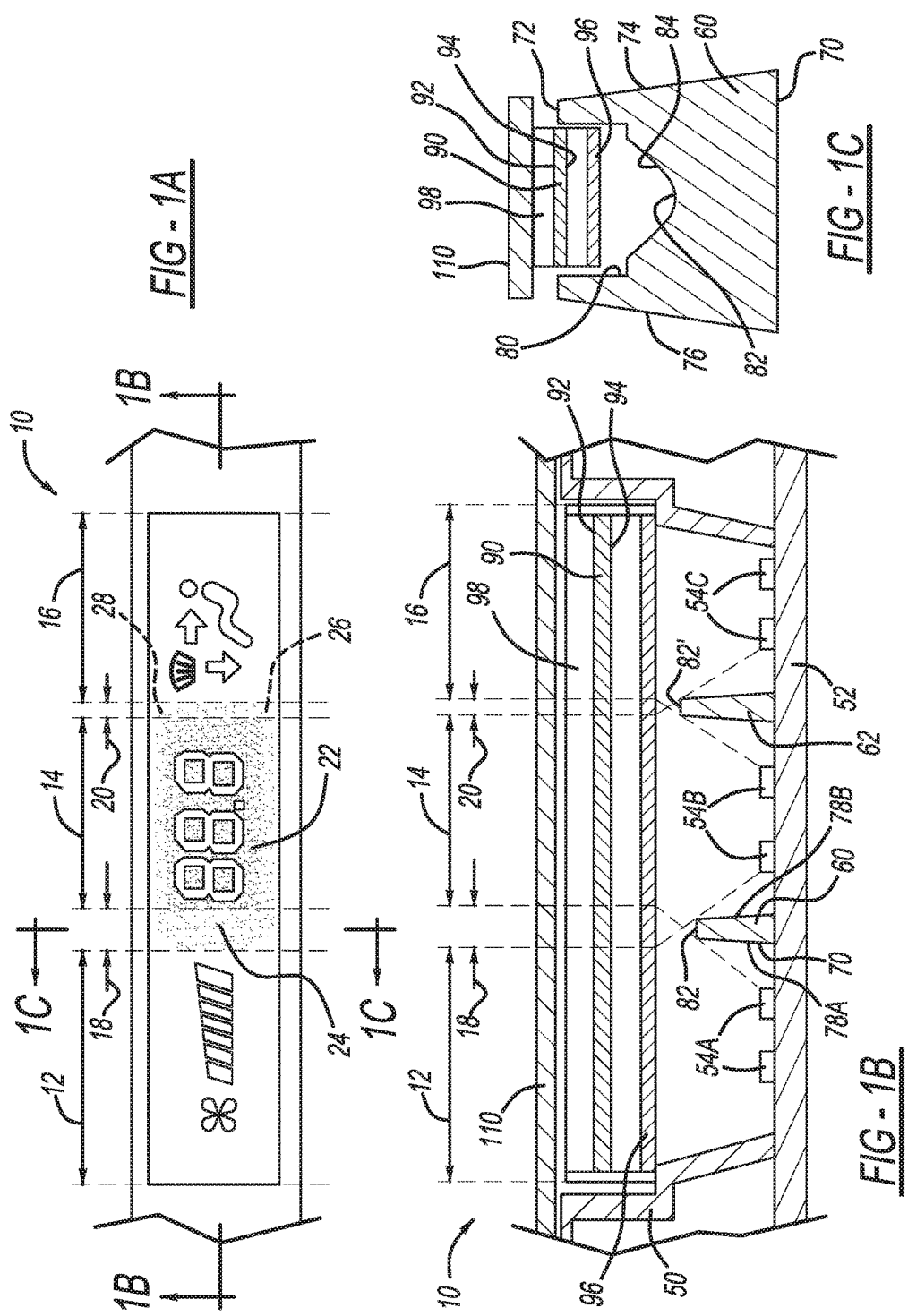

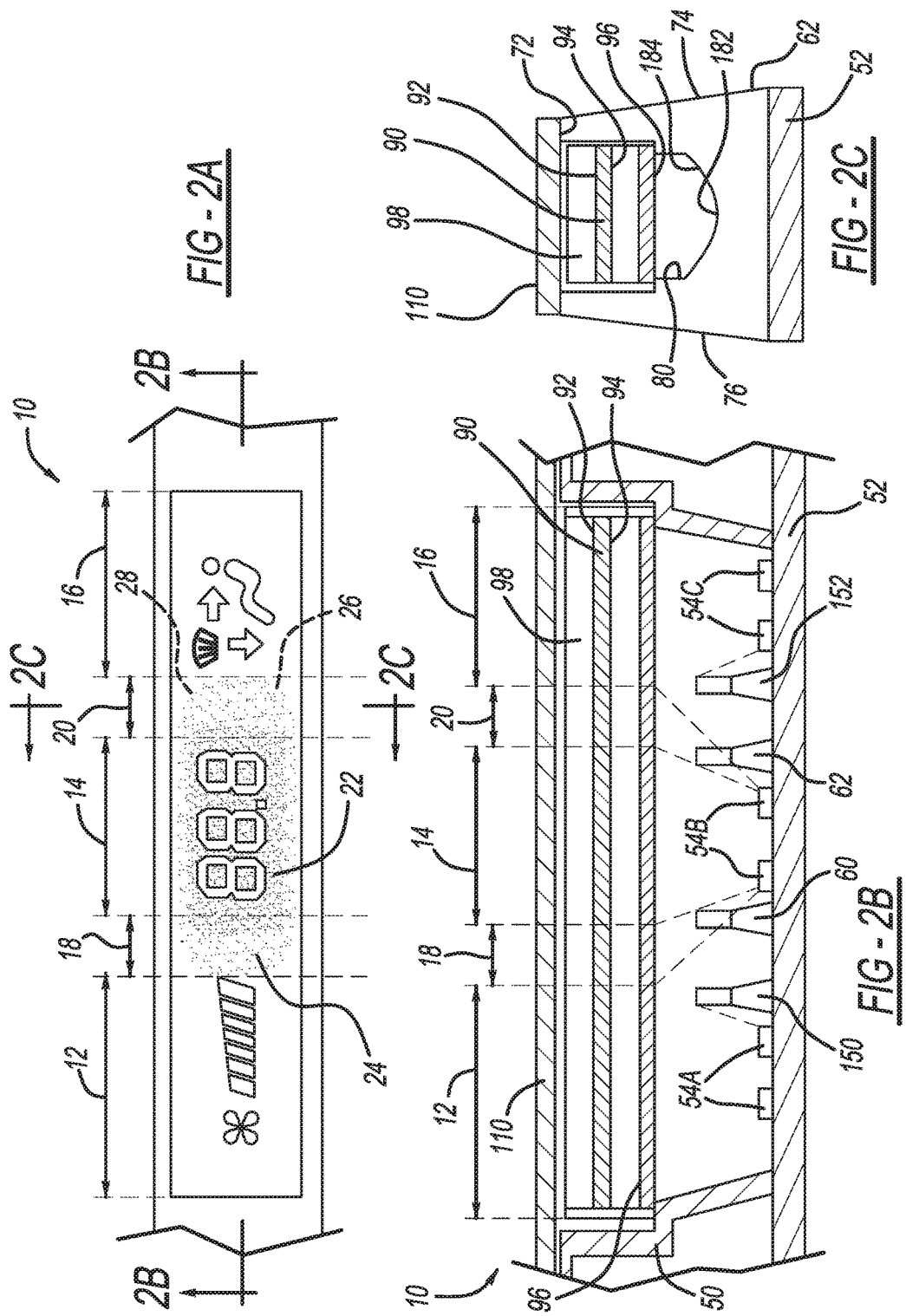

LCD DISPLAY WITH HIGHLIGHTING

FIELD

The present disclosure relates to an LCD display configured to highlight areas thereof with additional light.

BACKGROUND

This section provides background information related to the present disclosure, which is not necessarily prior art.

Liquid crystal displays (LCD) are used in a variety of applications to convey information to users and to facilitate operation of various systems. For example, vehicle heating, ventilation, and air-conditioning (HVAC) systems often include LCD displays on control panels thereof to facilitate operation of various HVAC modes, and to convey the status of the HVAC system to a user thereof.

Some HVAC systems include an LCD display divided into multiple display areas, with each area dedicated to a particular HVAC function or feature. For example, an LCD of an HVAC display may include a first display area dedicated to fan speed control, a second display area dedicated to temperature control, and a third display area dedicated to control of airflow direction. When a user inputs a command to the HVAC system, such as with buttons, knobs, or dials associated with control of the HVAC system, the display area of the LCD associated with the portion of the HVAC being controlled will be highlighted. Such highlighting is typically performed by increasing the backlight intensity of the display area associated with the feature being controlled. For example, if a user rotates a temperature dial in order to increase or decrease the temperature setting of the HVAC system, the area of the display that displays the HVAC temperature setting will be highlighted by increasing the backlight intensity of that area as compared to the other areas of the LCD displaying information relevant to features not being modified, such as fan speed and airflow direction.

While existing LCD displays are suitable for their intended use, they are subject to improvement. For example, with current LCDs, a very distinct, rigid, and abrupt border between the display area being highlighted and adjacent display areas not being highlighted is produced. An LCD with a gradual transition from a highlighted display area to a nonhighlighted display area would therefore be desirable. The present teachings satisfy this need in the art, as well as numerous others.

SUMMARY

This section provides a general summary of the disclosure, and is not a comprehensive disclosure of its full scope or all of its features.

The present teachings provide for a display including a liquid crystal layer, a light source, and a wall. The liquid crystal layer includes a first display area, a second display area, and a transition area therebetween. The light source is configured to generate light of a first intensity to illuminate the first display area with light of the first intensity, and generate light of a second intensity that is greater than the first intensity to illuminate the second display area with light of the second intensity. The wall is aligned with the transition area and is configured to direct light of the first intensity and light of the second intensity to the transition area such that at the transition area there is a gradual transition from light of the second intensity proximate to the second display area to light of the first intensity proximate to the first display area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is a plan view of a display according to the present teachings;

FIG. 1B is a cross-sectional view taken along line 1B-1B of FIG. 1A;

FIG. 1C is a cross-sectional view taken along line 1C-1C of FIG. 1A;

FIG. 2A is a plan view of another display according to the present teachings;

FIG. 2B is a cross-sectional view taken along line 2B-2B of FIG. 2A; and

FIG. 2C is a cross-sectional view taken along line 2C-2C of FIG. 2A.

Corresponding reference numerals indicate corresponding parts throughout the several views of the drawings.

DETAILED DESCRIPTION

Example embodiments will now be described more fully with reference to the accompanying drawings.

With initial reference to FIG. 1A, a display according to the present teachings is illustrated at reference numeral 10. The display 10 is configured for use in a variety of applications. For example, the display 10 is described herein as a display for displaying the status of various modes and features of a vehicle heating, ventilation, and air conditioning (HVAC) system. The HVAC system can be an HVAC system of any suitable vehicle, such as a passenger vehicle, a mass transit vehicle, military vehicle, aircraft, watercraft, recreational vehicle, or any other suitable vehicle. The display 10 can also be configured for use with non-vehicle HVAC systems, such as building systems.

The display 10 is divided into a first display area 12, a second display area 14, and a third display area 16. Between the first display area 12 and the second display area 14 is a first transition area 18. Between the second display area 14 and the third display area 16 is a second transition area 20. The different display areas 12, 14, and 16 can be configured to display any suitable information related to operation of the HVAC system, and for controlling operation thereof. For example and as illustrated, the first display area 12 displays fan speed information, the second display area 14 displays temperature setting information, and the third display area 16 displays airflow direction information. Although three display areas 12, 14, and 16 are illustrated, any suitable number of display areas can be included, such as two or more than three.

The display 10 is configured to highlight the particular display area 12, 14, or 16 displaying an HVAC function that the user has selected for control. For example and as illustrated, if the user is changing the temperature setting of the HVAC system, such as by rotating a temperature dial, the second display area 14 displaying temperature information will be highlighted and will be illuminated brighter than the first and third display areas 12 and 16 to provide the second display area 14 with a highlighted region 22. When the HVAC features displayed at the first and third display areas 12 and 16 are selected for control, the light intensity of the first or third display areas 12 or 16 will be increased relative to the other display areas to provide the first or third display areas 12 or 16 with the highlighted region 22.

With existing displays, the border between the highlighted region 22 and display areas that are not highlighted, and thus illuminated with light that is less intense than that used to provide the highlighted region 22, a very distinct, rigid, undesirable, and unsightly border is visible. Unlike existing displays, the present teachings provide for highlighted transition regions 24 and 26 on the sides of the highlighted region 22. The highlighted first transition region 24 is in the first transition area 18, and the highlighted second transition region 26 is in the second transition area 20 when the second display area 14 is highlighted to include the highlighted first 22.

At the first transition area 18, the highlighted first transition region 24 gradually and evenly transitions from having a light intensity adjacent to the highlighted region 22 that is equal to, or about equal to, the highlighted region 22, to a light intensity adjacent to the first display area 12 that is equal to, or about equal to, the nonhighlighted first display area 12. Thus in the highlighted first transition region 24, light intensity is the most intense adjacent to the second display area 14, and is the least intense adjacent the non-highlighted first display area 12. Therefore, it is nearly indistinguishable to the user where the highlighted region 22 ends and a nonhighlighted region begins. Similarly, at the highlighted second transition region 26, light intensity is most intense adjacent to the second display area 14, and is least intense adjacent to the third display area 16. To further make the transition from the highlighted region 22 to nonhighlighted regions gradual and as indistinguishable as possible, the first and second transition regions 24 and 26 can have tapered corners 28, where transition to the nonhighlighted regions occurs sooner.

When the function of the first display area 12 is selected for modification, the highlighted first transition region 24 will be arranged opposite to that shown in FIG. 1A such that the light intensity of the first transition region 24 gradually decreases from the first display area 12 towards the second display area 14. The second transition area 20 will not be illuminated with the highlighted second transition region 26. When the function of the third display area 16 is selected for modification, and thus the highlighted region 22 is at the third display area 16, the highlighted second transition region 26 will be provided at the second transition area 20. The second transition region 26 will gradually reduce in intensity from the third display area 16 to the second display area 14, and the first transition area 18 will not include the highlighted first transition region 24.

With continued reference to FIG. 1A, and additional reference to FIG. 1B, features of the display 10 that provide the highlighted first and second transition regions 24 and 26 at the first and second transition areas 18 and 20 respectively will now be described. The display 10 generally includes a support structure 50 having a base 52, which may be a reflective base. At the base 52 is a light source, which may be any suitable light source. For example, and as illustrated, the light source can include a plurality of light emitting diodes (LEDs) 54A-54C. Any suitable number of LEDs 54A-54C may be included. For example and as illustrated, a first group of two LEDs 54A are provided opposite to the first display area 12, and are configured to illuminate at least the first display area 12. A second group of LEDs 54B are located opposite to the second display area 14, and are configured to illuminate at least the second display area 14. A third group of LEDs 54C are opposite to the third display area 16, and are configured to illuminate at least the third display area 16. The LEDs 54A-54C can be illuminated at a variety of different intensities, such as a low intensity to provide the display areas 12, 14, and 16 with standard, unhighlighted, illumination intensity, or a high intensity that is greater than the low intensity to provide any one of the display areas 12, 14, 16 with a light intensity sufficient to generate highlighted region 22 at any one of the display areas 12, 14, or 16, as well as the illumination at first and/or second transition regions 24 and 26.

With continued reference to FIGS. 1A and 1B, and additional reference to FIG. 1C, between the groups of LEDs 54A, 54B, and 54C is a first wall 60 and a second wall 62. For example and as illustrated, the first wall 60 is between the LEDs 54A and 54B. The second wall 62 is between the LEDs 54B and 54C. If, for example, the display 10 includes only the first display area 12 and the second display area 14, only the first wall 60 will be included. If the display 10 includes only the second display area 14 and the third display area 16, only the second wall 62 will be included. If the display 10 includes additional display areas, additional walls can be included.

The first wall 60 is opposite to the first transition area 18, and the second wall 62 is opposite to the second transition area 20. The first and second walls 60 and 62 extend from the base 52, and may have the same height or different heights with respect to the cross-sectional view of FIG. 1B. In the example illustrated in FIG. 1B, the first wall 60 is shorter than the second wall 62 with respect to the concave recesses 82 thereof, however, the first and second walls 60 and 62 may have the same height with respect to the concave recesses 82 thereof. The increased height of the concave recesses 82 of the second wall 62 will result in the second transition area 20 being more narrow as compared to the first transition area 18. The different heights of the first and second walls 60 and 62 with respect to the cross-sectional view of FIG. 1B is provided for exemplary purposes only, as it is likely that the heights will be the same in any one particular display 10. FIG. 2B, which will be described in detail below, includes a plurality of walls, including the first and second walls 60 and 62, which have the same height.

With continued reference to FIGS. 1A and 1B, and additional reference to FIG. 1C, exemplary features of the first wall 60 will now be described. The first wall 60 is substantially similar to the second wall 62, except for in some applications the relative heights thereof, and thus the description of the first wall 60 also applies to the second wall 62. The first wall 60 includes a base or lower end 70, and a distal or upper end 72 (see FIG. 1C, for example). The base 70 is at the base 52, and the distal end 72 is opposite to the base 70. The first wall 60 further includes a front end 74 and a rear end 76, as illustrated in FIG. 1C. FIG. 1B illustrates a first side 78A and a second side 78B of the first wall 60.

The first wall 60 further includes a receptacle 80, as illustrated in FIG. 1C, which is between the front end 74 and the rear end 76. The receptacle 80 defines a concave recess or valley 82, which is concave with respect to a liquid crystal (LC) layer 90, a diffusion sheet 96, and a front cover 110 of the display 10. The concave recess 82 includes a sloped portion 84, which slopes away from the LC layer 90, the diffusion sheet 96, and the front cover 110. The receptacle 80, and the concave recess 82 thereof, is open at the first and second sides 78A and 78B of the first wall 60, in order to receive light from the first and second group of light emitting elements 54A and 54B and direct the light to the first and second display areas 12 and 14, as well as the first transition area 18, as described further herein.

The display 10 further includes standard LCD display components, such as the LC layer 90 and the diffusion sheet 96, which are supported by the support structure 50. The LC layer 90 is a conventional liquid crystal layer configured in any suitable manner to display the images of the first, second, and third display areas 12, 14, and 16. The LC layer 90 includes a first side 92, and a second side 94, which is opposite to the first side 92 and faces the diffusion sheet 96. The diffusion sheet 96 is between the LC layer 90 and the light sources 54A-54C and the first and second walls 60 and 62. The diffusion sheet 96 is any suitable diffusion sheet configured to diffuse light emitted by the lighting elements 54A-54C as the light passes through the diffusion sheet 96 to the LC layer 90. On the first side 92 of the LC layer 90 is a glass layer 98, which is covered by the front cover 110.

Light emitted by the light emitting elements 54A-54C passes through the diffusion sheet 96 and the LC layer 90 to illuminate the first, second, and third display areas 12, 14, and 16, as well as the first and second transition areas 18 and 20. Light from the first and second groups of light emitting elements 54A and 54B also passes into the receptacle 80 of the first wall 60, where the concave recess 82 reflects the light to the first transition area 18. When the light intensity of the light emitting elements 54B is increased to provide the highlighted region 22, light generated by the second light emitting elements 54B and the first light emitting elements 54A will reflect off of the concave recess 82 to generate the highlighted first transition region 24, which gradually decreases in intensity from the highlighted region 22 to the unhighlighted first display area 12, as explained above. The shape of the concave recess 82 also provides the tapered corners 28. Light emitted by the second and third light emitting elements 54B and 54C contacts a concave recess 82' of the second wall 62, which is substantially similar to the concave recess 82, to provide the highlighted second transition region 26 and the tapered corners 28 thereof.

To highlight the first display area 12, the intensity of the first group of light emitting elements 54A can be increased to be greater than the light intensity of the light emitting elements 54B. Light from the light emitting elements 54A and 54B is reflected off of the concave recess 82 to the first transition area 18 to provide the highlighted first transition region 24, which will gradually and uniformly decrease in intensity from the first display area 12 to the second display area 14.

To highlight the third display area 16, the intensity of the third group of light emitting elements 54C can be increased to be greater than the light intensity of the second light emitting elements 54B. Light from the light emitting elements 54B and 54C is reflected off of the concave recess 82' to the second transition area 20 to provide the highlighted second transition region 26, which gradually and uniformly decreases in intensity across the second transition area 20 from the third display area 16 towards the second display area 14.

With additional reference to FIGS. 2A-2C, the display 10 may be configured to include a third wall 150 and a fourth wall 152, in addition to the first and second walls 60 and 62. With particular reference to FIG. 2C, the walls 60, 62, 150, and 152 can each be configured slightly different from the first and second walls 60 and 62 of FIGS. 1B and 1C. Specifically, as illustrated in FIG. 2C, the walls 60, 62, 150, and 152 can each be configured to include a concave recess 182 having a sloped portion 184, which is more gradual than the sloped portion 84. As a result, light reflected off of the concave recess 182 results in the first and second transition regions 24 and 26 having a more rounded appearance. By providing the third and fourth walls 150 and 152 adjacent to the first and second walls 60 and 62 respectively, the first and second transition regions 24 and 26 can be advantageously widened, so as to make the transition from the highlighted region 22 to unhighlighted regions of the first and third display areas 12 and 16, for example, even less distinct and visible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A display comprising:
a liquid crystal layer including a first display area, a second display area, and a transition area therebetween;
a light source configured to generate light of a first intensity to illuminate the first display area with light of the first intensity, and generate light of a second intensity that is greater than the first intensity to illuminate the second display area with light of the second intensity; and
a wall aligned with the transition area and configured to permit passage of light of the first intensity and light of the second intensity to the transition area such that at the transition area there is a gradual transition from light of the second intensity proximate to the second display area to light of the first intensity proximate to the first display area;
wherein a concave portion of the wall extends towards a light diffusion layer, terminates prior to reaching the light diffusion layer, and reflects light of the first and second intensities to the transition area; and
wherein the concave portion is open at a first side and a second side of the wall, and closed at a front end and a rear end of the wall, such that a vertex of the concave portion extends in a direction parallel to a width of the display along which an additional wall is arranged.

2. The display of claim 1, wherein the light source is an LED source.

3. The display of claim 1, wherein:
the first display area and the second display area are configured to display setting information regarding operation of a vehicle heating, ventilation, and air conditioning system; and
light of the second intensity is directed to the second display area displaying setting information selected for modification by a user.

4. The display of claim 1, wherein the additional wall is opposite to a second transition area between the second display area and a third display area.

5. The display of claim 1, wherein the concave portion is configured to direct light of the first intensity and light of the second intensity to the transition area.

6. A display comprising:
a liquid crystal layer including a first display area, a second display area, and a transition area therebetween;
a light source including: a first portion opposite to the first display area and configured to illuminate the first display area at a first light intensity; and a second portion opposite to the second display area and configured to illuminate the second display area at a second light intensity that is different than the first light intensity;
a light diffusion layer between the light source and the liquid crystal layer; and
a wall opposite to the transition area and between the first portion and the second portion of the light source, the wall extending towards the light diffusion layer and including a receptacle spaced apart from the light diffusion layer such that light generated by both the first and second portions of the light source may pass through the receptacle to illuminate the transition area;
wherein when the first light intensity is different from the second light intensity, illumination of the transition area gradually transitions from light of the first light intensity to light of the second light intensity;
wherein a concave portion of the wall extends towards the light diffusion layer, terminates prior to reaching the light diffusion layer, and reflects light of the first and second intensities to the transition area; and
wherein the concave portion is open at a first side and a second side of the wall, and closed at a front end and a rear end of the wall, such that a vertex of the concave portion extends in a direction parallel to a width of the display along which an additional wall is arranged.

7. The display of claim 6, wherein:
the first portion and the second portion of the light source each include at least one light emitting diode; and
the concave portion is concave relative to the light diffusion layer.

8. The display of claim 6, wherein:
the first display area and the second display area are configured to display setting information regarding operation of a vehicle heating, ventilation, and air conditioning system; and
light of the second light intensity is directed to one of the first or second display areas displaying setting information selected for modification by a user.

9. A display comprising:
a liquid crystal layer including a first display area, a second display area, a third display area, a first transition area, and a second transition area, wherein the second display area is between the first and third display areas, the first transition area is between the first and second display areas, and the second transition area is between the second and third display areas;
a light source including:
a first group of light emitting elements opposite the first display area and configured to illuminate the first display area;
a second group of light emitting elements opposite to the second display area and configured to illuminate the second display area; and
a third group of light emitting elements opposite to the third display area and configured to illuminate the third display area;

a first wall opposite to the first transition area, and between the first group of light emitting elements and the second group of light emitting elements;

a second wall opposite to the second transition area, and between the second group of light emitting elements and the third group of light emitting elements; and a light diffusion layer including a first side and a second side opposite to the first side, on the first side is the liquid crystal layer, and on the second side is the light source and the first and second walls;

wherein both the first wall and the second wall extend from a base including the light source towards the light diffusion layer, and include a concave surface that terminates prior to reaching the light diffusion layer to direct light generated by the light source to the liquid crystal layer, the concave surface is concave relative to the liquid crystal layer; and wherein the concave surface is open at a first side and a second side of each of the first wall and the second wall, and closed at a front end and a rear end of each of the first wall and the second wall, such that a vertex of the concave surface extends in a direction parallel to a width of the display along which the first wall and the second wall are arranged.

10. The display of claim 9, wherein the light source is a light emitting diode (LED) light source, and each one of the first, second, and third groups of light emitting elements include light emitting diodes.

11. The display of claim 9, wherein each one of the first display area, the second display area, and the third display area is configured to display information regarding operation of a vehicle heating, ventilation, and air conditioning system.

12. The display of claim 9, wherein the concave surfaces of the first wall and the second wall are equidistant from the liquid crystal layer.

13. The display of claim 9, wherein the concave surface of each of the first and the second walls partially defines a receptacle between the concave surface and the light diffusion layer.

14. The display of claim 9, wherein each one of the first wall and the second wall define a receptacle including the concave surface.

15. The display of claim 9, wherein the light source is configured to apply light of a first intensity to at least one of the first, second, and third display areas, and apply light of a second intensity that is greater than the first intensity to any one of the first, second, and third display areas to highlight any one of the first, second, and third display areas.

16. The display of claim 15, wherein:
when the light source directs light of the second intensity to the second display area and light of the first intensity to both the first display area and the third display area, at the first and second transition areas light of the second intensity gradually transitions to light of the first intensity.

17. The display of claim 16, wherein the first and second walls partially obstruct passage of light from the light source to the liquid crystal layer at the first and second transition areas respectively to gradually transition light of the second intensity to light of the first intensity.

18. The display of claim 17, wherein:
each one of the first wall and the second wall includes a receptacle between a front end and a rear end thereof, the receptacles are exposed at both sides of each of the first wall and the second wall; and
the receptacles are each partially defined by the concave surface, which is configured to taper light of the second intensity directed to corners of the first and second transition areas.

19. The display of claim 9, further comprising:
a third wall opposite to the first transition area and proximate to the first wall; and
a fourth wall opposite to the second transition area and proximate to the second wall;
wherein the third wall and the fourth wall are configured to direct light to the liquid crystal layer to widen the first and the second transition areas.

* * * * *